United States Patent [19]

Ney et al.

[11] Patent Number: 4,471,453
[45] Date of Patent: Sep. 11, 1984

[54] MEASURING MIS-MATCH BETWEEN SIGNALS

[75] Inventors: Hermann Ney; Rudolf Geppert, both of Hamburg, Fed. Rep. of Germany

[73] Assignee: U.S. Philips Corporation, New York, N.Y.

[21] Appl. No.: 304,294

[22] Filed: Sep. 21, 1981

[30] Foreign Application Priority Data

Sep. 20, 1980 [DE] Fed. Rep. of Germany ....... 3035565

[51] Int. Cl.³ .............................................. G06F 15/34
[52] U.S. Cl. ..................................... 364/728; 364/819
[58] Field of Search ................................ 364/728, 819

[56] References Cited

U.S. PATENT DOCUMENTS 3,816,722 6/1974 Sakoe et al. .......................... 364/728
4,368,456 1/1983 Forse et al. .......................... 364/728

FOREIGN PATENT DOCUMENTS 162183 12/1981 Japan .................................... 364/728

OTHER PUBLICATIONS

Hiroaki Sakoe and Seibi Chiba, "IEEE Transactions on Acoustics, Speech and Signal Processing", Feb. 1978, pp. 43–49.
George White and Richard Neely, "IEEE Transactions on Acoustics, Speech and Signal Processing", Apr. 1976, pp. 183–188.

*Primary Examiner*—Gareth D. Shaw
*Assistant Examiner*—Karl Haung
*Attorney, Agent, or Firm*—Jack E. Haken; James J. Cannon, Jr.

[57] ABSTRACT

The degree of mis-match which would be obtained between a test and a reference signal, for example speech signals, should their time-axes be subjected to that relative shift and/or distortion which is required to minimize the degree of mismatch is carried out by sampling the two signals at regular intervals and storing these samples in memories. All the samples of one signal are then read out in succession from one memory; each successive sample of the other signal is read out from the other memory, and the difference between each pair of samples is formed in a subtractor. Each difference value from the subtractor is added to the smallest of three quantities, X, Y and Z and the result stored in a register to form the new quantity X. This new quantity X is also stored in a further memory cyclically addressed in tandem with the memory 12. The quantity Z is the previous content of the location of memory into which the new quantity X is written, and the quantity Y is the previous value of the quantity Z, obtained by shifting the previous value of the quantity Z in a two-stage shift register. Thus the quantities X, Y and Z correspond to the present sample of the other signal and the immediately preceding sample of the one signal, the immediately preceding sample of both signals, and the present sample of the one signal and the immediately preceding sample of the other signal respectively. The result is that each successive value of the quantity X is the optimum cumulative distance value between the two signals for the corresponding pair of samples should these be assigned to each other when matching the two signals to each other. The process is continued until all the sampled value have been read and paired, at which point the value of the quantity X is a measure of the above-defined degree of mis-match.

5 Claims, 4 Drawing Figures

MEASURING MIS-MATCH BETWEEN SIGNALS

BACKGROUND OF THE INVENTION

1. Field of the Invention

The invention relates to a method of measuring the degree of mis-match which would be obtained between first and second signals should their time-axes be subjected to a time alignment (if any) which is required to minimize the degree of mis-match, in which method the values of both signals are sampled at regular time intervals, the sampled values are stored, a difference value and a distance value is obtained for each combination of a sampled value of the first signal and a sampled value of the second signal, at least if the corresponding distance value is less than a predetermined amount. Said difference and distance values are obtained in succession for the combinations of the first sampled value of the first signal and the successive sampled values of the second signal, the next sampled value of the first signal and the successive sampled values of the second signal, and similarly up to the last sampled value of the first signal and the successive sampled values of the second signal. Each said distance value is determined from the corresponding difference value and the smallest of those three adjacent distance values (if present) which have been obtained for the combination of the corresponding sampled value of the first signal and the sampled value of the second signal immediately preceding the corresponding sampled value of the second signal, the combination of the corresponding sampled value of the second signal and the sampled value of the first signal immediately preceding the corresponding sampled value of the first signal, and the combination of the sampled values of both signals immediately preceding the corresponding sampled values of the first and second signals, and a measure of the said degree of mis-match is derived from the distance value obtained for the combination of the last sampled values of both signals.

The invention also relates to an apparatus for carrying out such a method.

2. Description of the Prior Art

Such a method, used for speech recognition purposes, is known from the magazine "IEEE TRANSACTIONS ON ACOUSTICS, SPEECH AND SIGNAL PROCESSING", Vol. ASSP-26, No. 1, February 1978, pages 43 to 49.

In many cases each signal will comprise a plurality of components, as is the case with speech signals which can be divided into a plurality of spectral ranges by means of a filter bank. A plurality of distance values could be obtained for such signals by applying the method separately for each component. However, this may give rise to different relative shifts and/or distortions for the time-axes when the method is applied for the different components, which does not correspond to reality and which may yield incorrect or non-optimum measurements. This may be the case if the degree of mis-match between the sound level variation of a test speech signal and the corresponding variation of a plurality of reference signals corresponding to different words is measured, the reference signal with the best conformity is determined from the various residual differences obtained, and it is also required to recognize the characteristics which are typical of a particular speaker. It is an object of the invention to enable this problem to be overcome.

SUMMARY OF THE INVENTION

The invention provides a method of measuring the degree of mis-match which would be obtained between first and second signals should their time-axes be subjected to a time alignment (if any) which is required to minimize the degree of mis-match, said method comprising the operations of (a) sampling values of both signals at regular time intervals and storing the sampled values, (b) obtaining a difference value and a distance value for each combination of a sampled value of the first signal and a sampled value of the second signal, at least if the corresponding distance value is less than a predetermined amount, in such manner that said difference and distance values are obtained in succession for the combinations of the first sampled value of the first signal and the successive sampled values of the second signal, the next sampled value of the first signal and the successive sampled values of the second signal, and similarly up to the last sampled value of the first signal and the successive sampled values of the second signal, and each said distance value is calculated as the sum of the corresponding difference value and the smallest of those three adjacent distance values (if present) which have been obtained for the combination of the corresponding sampled value of the first signal and the sampled value of the second signal immediately preceding the corresponding sampled value of the second signal, the combination of the corresponding sampled value of the second signal and the sampled value of the first signal immediately preceding the corresponding sampled value of the first signal, and the combination of the sampled values of both signals immediately preceding the corresponding sampled values of the first and second signals, and (c) a measure of the degree of mis-match is derived from the distance value obtained for the combination of the last sampled values of both signals, in which method said operations (a), (b) and (c) are performed for one component of each signal and a modified set of such operations (a), (b) and (c) is also preformed separately and in parallel for another component or set of other components of each signal, the modification being that the smallest of those three adjacent distance values (if present) is replaced each time by that adjacent distance value which corresponds in time to the smallest adjacent distance value currently used to obtain the distance value for the one component.

For the case described in the foregoing the one component may be the sound level, the other components being the intensities of various spectral components. This can yield a plurality of overall distance values which may be used for the final decision.

The more such overall distance values are produced however, the more computation will be required, which is not always necessary. Frequently, it is sufficient to combine some or all of the other components to form a multi-dimensional vector, so that a correspondingly smaller number of overall distance values is obtained. Alternatively, in the modified set of operations (a), (b) and (c) each difference value may be calculated as a combination of the corresponding difference values for the members of the set of other components, for example all the spectral components in the case of a speech signal.

The so-called city-block distances, which are obtained from the sum of the differences between the individual other components, may be used for these difference values, or the Euclidean distances may be used.

The city block distance d(i,j) for two n-component signals x and y for a sample i of signal x and a sample j of signal y is given by $$d(i,j) = \sum_{k=1}^{n} | x_k(i) - y_k(j) |$$

In order to obtain the squared Euclidean distance the squares of the differences between the values of corresponding components of the two signals for the relevant samples are added together.

For the purpose of processing the distance values determined for the last sampled values of both signals all these distance values may be applied directly to a classifying device. Intermediate processing of the overall distance values, for example division thereof by a value which allows for the duration or the number of sampled values, is not necessary when one of the signals is a reference signal.

BRIEF DESCRIPTION OF THE DRAWINGS

Embodiments of the invention will now be described, by way of example, with reference to the drawings. In the drawings.

DESCRIPTION OF THE PREFERRED EMBODIMENT

Figure 1A:
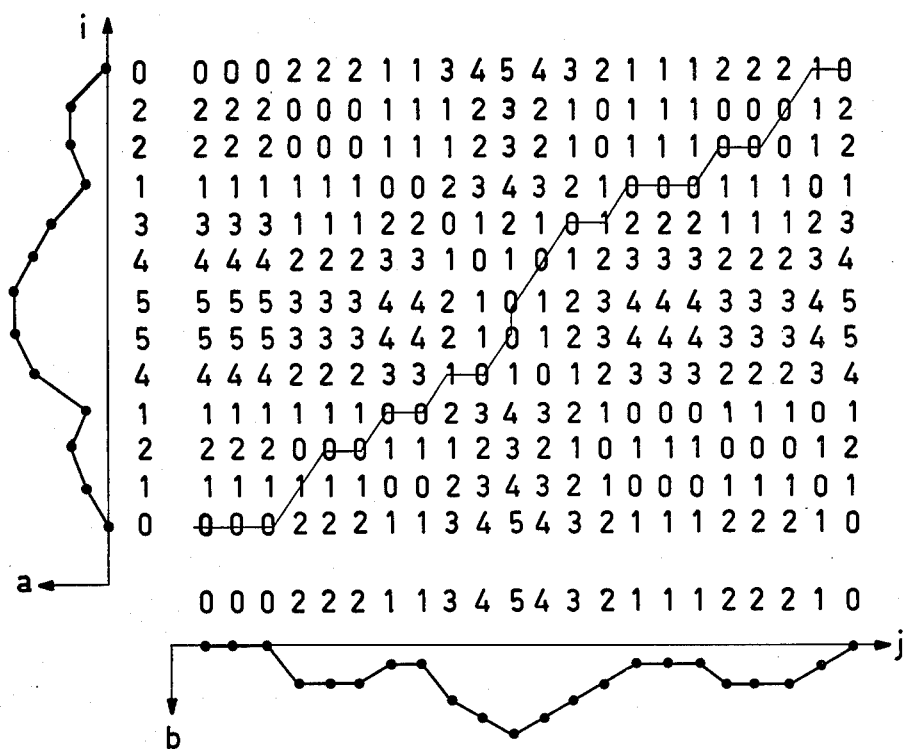
FIGS. 1a and 1b are diagrams which illustrate the principle of time-matching.

FIG. 1a shows a matrix of values, which matrix contains the difference values d(i,j) for each of a regular succession of samples of one signal relative to each of a regular succession of samples of another signal. The one signal A is, for example, a reference signal, whose sampled values a(i) are shown on the left side of the matrix, the numerical values of the individual sampled values being specified adjacent these sampled values. To simplify the explanation, only one component of each signal is considered. The sequence numbers i of the individual sampled values are not given separately.

Similarly, the other signal B (a test signal), with the sampled values b(j), is shown at the lower edge of the matrix, the numerical values of the individual sampled values being also specified. Both signals have been normalized to a mean intensity or a mean sound level.

In the matrix, for the somewhat idealized values adopted here, a multitude of combinations of sampled values of both signals occur whose difference value is zero, that is, the two sampled values have the same amplitude. Consequently, an optimum time-match of the two signals, which indicates which sampled values of the two signals should be pairwise correlated to each other, individual sampled values of one of the two signals being assignable to a plurality of consecutive sampled values of the other signal, is represented by a sequence of horizontally, vertically or diagonally adjoining matrix values which is such that the sum of said matrix values, that is the sum of the difference values for the relevant pairs of sampled values, yields an overall minimum. The value of this minimum is then a measure of the conformity or of the overall distance between the two signals. In FIG. 1a such a sequence is represented by the matrix points which are interconnected by means of a line. It is to be noted that this particular interconnection line is not the only one which can yield a minimum, because, especially at the top right of the matrix, interconnections are possible at some locations which are shifted by one matrix row, without a departure occurring from this optimum path. This ambiguity may for example be caused by the fact that the two signals are stationary for a plurality of sampled values or that a sampled value of one signal is situated intermediate two consecutively sampled values of the other signal, so that both combinations lead to the same minimum value.

In most cases, especially in the case of recognition problems, it is not necessary to know the precise optimum sequence of sampled-value combinations, but only the overall distance between two signals, that is the sum of the difference values in said sequence.

How the value of said overall distance is determined for the one component of each signal will now be explained with reference to FIG. 1b, in which optimum cumulative distance values D(i,j) for each point of the matrix of FIG. 1a are themselves represented in a matrix. The values given in this optimum cumulative distance matrix, are determined as follows:

$$D(i,j) = d(i,j) + \min[D(i,j-1), D(i-1,j), D(i-1,j-1)].$$

The values in the bottom row and the left-hand column of this matrix are the accumulated difference values which are given in the corresponding row and column respectively of the matrix of FIG. 1a; they can also be obtained by means of the above equation if a value which certainly exceeds the actual difference value is adopted for each of the relevant values in the adjacent non-available row and/or column.

As for each new optimum-cumulative distance value only those distance values have to be taken into account which are associated with the sampled values of the signals which immediately precede or coincide in time, a preferred direction is obtained for the optimum sequence of values in the matrix, which direction extends approximately diagonally from the bottom-left to the top-right. This diagonal is in conformity with the fact that for both signals the time extends solely in one direction. For the same reason only a part of the complete matrix is shown in FIG. 1b, namely the part for which the optimum cumulative values in the present example are one-digital values, because owing to the summation in the above expression the values not shown can only be greater and thus cannot form part of the optimum sequence of values.

Figure 1B:
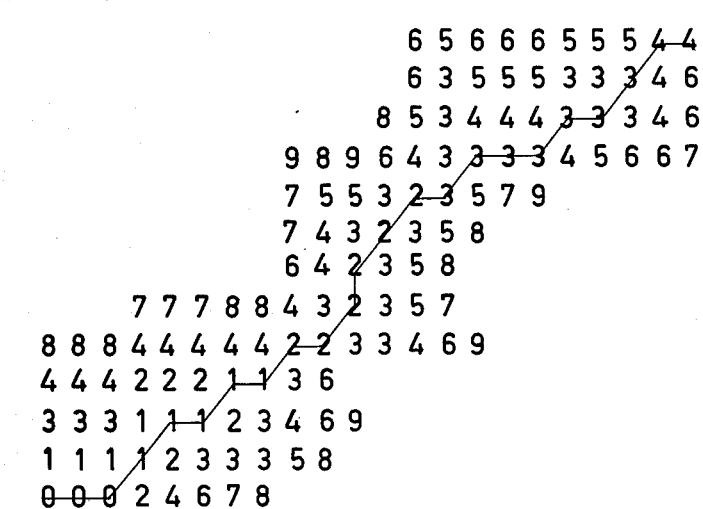

As will become evident, for determining the optimum sequence of sampled-value pairs for the two signals or the overall distance value for the two signals, it is not necessary to store at any given time the entire matrix of optimum cumulative distance values or all the values represented in FIG. 1b, but basically only a number of values equal at the most to one plus the number of values in one row of this matrix. This is so if, for each sampled value of the one signal a(i), a plurality of successive sampled values of the other signal b(j) are processed consecutively. More particularly, first of all the values of the bottom row of the matrix of optimum cumulative distance values are determined by forming the cumulative sums of the difference values for the corresponding sampled values of the two signals until a predetermined limit value is exceeded, which in the present case is 9. The optimum sequence of the values continues in this row until the next higher value to the minimum value, that is, in the present row the next higher value to the value 0, occurs. Thus in the present example this row indicates that three values of the optimum sequence are contained in the corresponding row of FIG. 1a; this is again represented in FIG. 1b by an interconnection of the corresponding values. This means that the first three sampled values of the signal B should be assigned to the first sampled value of the signal A.

In the next row the difference values of the magnitude 1 are added to the smallest adjacent cumulative distance values, which initially have the value 0, so that the value in the second row initially correspond to the values in the second row of the matrix in FIG. 1a. It is not until the fifth column is reached where there is no longer an adjacent cumulative distance value equal to 0, at which point the optimum cumulative distance values in this row start to become greater, that is, for the optimum time-matching the second sampled value a(2) of the one signal should be assigned to the fourth sampled value b(4) of the other signal. Processing proceeds step by step in this way, the optimum cumulative distance values of the same row determined so far being stored up to the point being processed and the optimum cumulative distance values of the preceding row being stored for the further points to be processed.

The sequence of values interconnected by the line in FIG. 1b shows that the values in this sequence increase each time the difference value at the corresponding point in the matrix of FIG. 1a is not 0. Moreover, it will be seen that after processing the top row, an optimum cumulative distance value is obtained which is equal to the sum of the difference values in the optimum sequence of the combinations of pairs of sampled values one from each of the top signals. This last distance value obtained therefore represents the overall distance between the relevant component of the two signals. Thus, said value is obtained directly without previously determining and buffering the entire matrix of distance values, it being sufficient to buffer at any given time a number of values equal at the most to one plus the number of values on one row of the matrix of distance values.

Figure 2:
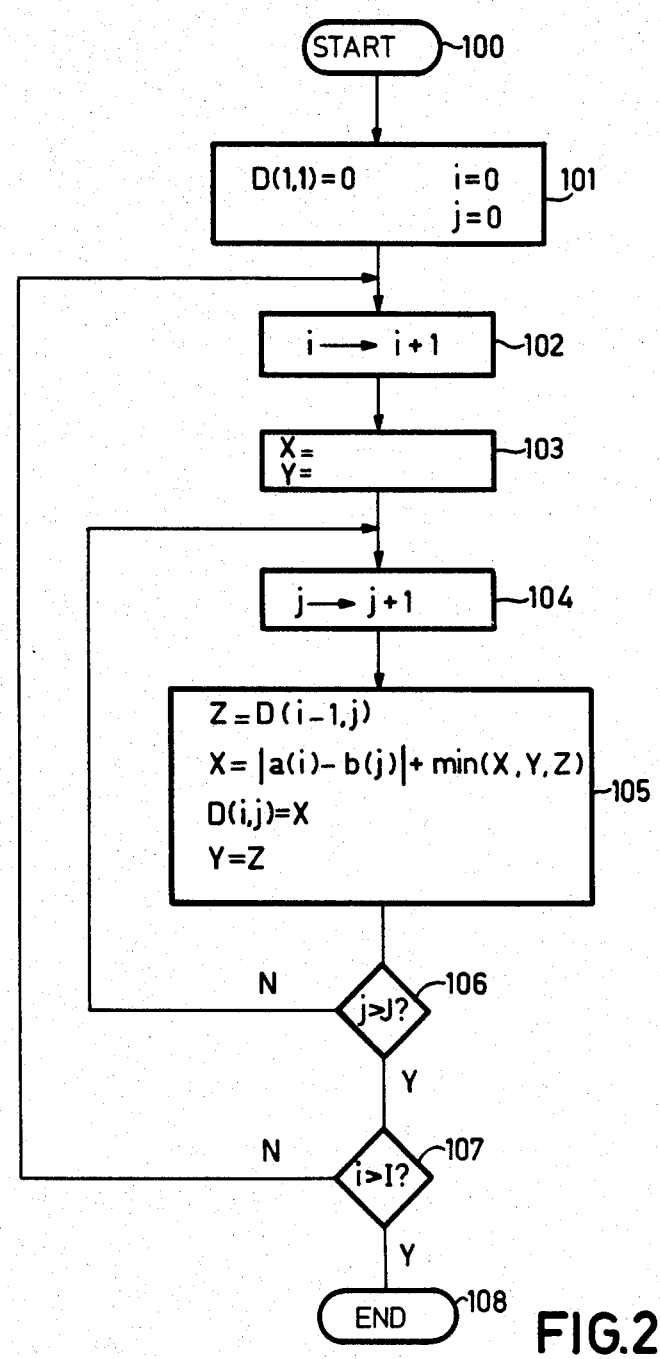
FIG. 2 is a flow chart of a possible sequence of individual processing steps.

FIG. 2 is a flow chart which shows in more detail a possible sequence of individual processing steps and their recurrence in order to carry out the process indicated above. The symbol 100 represents the start of the process. In the block 101 the index i is set to 0 and the index j is set to 0. Also in this block the first value of the matrix of distance values is assigned the value 0, because it is assumed that initially the two signals correspond, that is that they both begin at 0.

In the block 102 the index i is incremented by 1, which means proceeding to the values of the next row of the matrix. In the block 103 a starting value is assigned to the two magnitudes X and Y, which starting value is for example equal to or greater than the largest number which it has been decided will be included (if it occurs) in the matrix of FIG. 1b. The magnitudes X and Y together with a further magnitude Z constitute three values which are buffered for the computation of each new optimum cumulative distance value: said values represent the three adjacent optimum cumulative distance values in each processing step, of which distance values the lowest is used for determining the new distance value. The three values correspond to the adjacent matrix points in the manner symbolized by the four points next to the block 103. The non-referenced point represents the point for which the new optimum cumulative distance value is to be determined.

In the block 104 the index j is incremented by 1, which means proceeding to the next value in the current row.

Actual processing is effected in the block 105. The magnitude Z assumes the optimum cumulative distance value $D(i-1,j)$ of the preceding row at the relevant location. The magnitude X is made equal to the sum of the current difference value, which in this case is the difference between the relevant sampled values of the two signals $a(i)$ and $b(j)$, and the minimum value of the magnitudes X, Y and Z, where the value used for the magnitude X is the value valid so far. Thus the magnitude X always has the value required for the next processing step. Subsequently, the value of the magnitude X thus determined is stored in a memory for the distance values. Finally, the magnitude Y is given the value of the magnitude Z. During the next cycle the magnitude Z assumes the optimum cumulative distance value of the preceding row at the next point, so that the arrangement of the four points symbolically shown at the right of FIG. 2 will have shifted by one step to the right in the matrix.

In step 106 it is ascertained whether all points of a row have been processed. If this is not the case, the index j is incremented again. If it is the case, i.e. if the maximum value J is exceeded, it is ascertained in the step 107 whether all rows have been processed. If this is not the case, the process returns to the block 102, the row index i is incremented by 1, the column index j is reset to 0 and the process is continued. When the last row has been processed, the process is terminated at 108 and the instantaneous value of the magnitude X then reached represents the overall distance between the two signals.

If the signals are speech signals whose sound level as a function of time has to be matched to a reference signal and, in addition to the overall distance value then obtained, one or more overall distance values of one or more other components of the signal which has thus been time-matched have to be determined, the process proceeds in a largely similar fashion. It suffices that a separate group of magnitudes X, Y and Z is provided for each component to be processed separately, and that in block 105 the new value for the magnitude X is derived from the minimum of the values of the magnitudes X, Y and Z soley for the one component which determines the time-matching, while for the other components the corresponding value of the relevant component is adopted. Thus, if for the time-matching determining component at a specific point, that is for a specific pair of values of i and j, the value of the magnitude Y is a minimum, the corresponding value of the magnitude Y for the other components is employed for determining the cumulative distance value of the relevant other component, even if for these other components the value of the magnitude Y does not constitute the minimum. Thus, the operations in block 105 should be carried out separately for each component.

Figure 3:
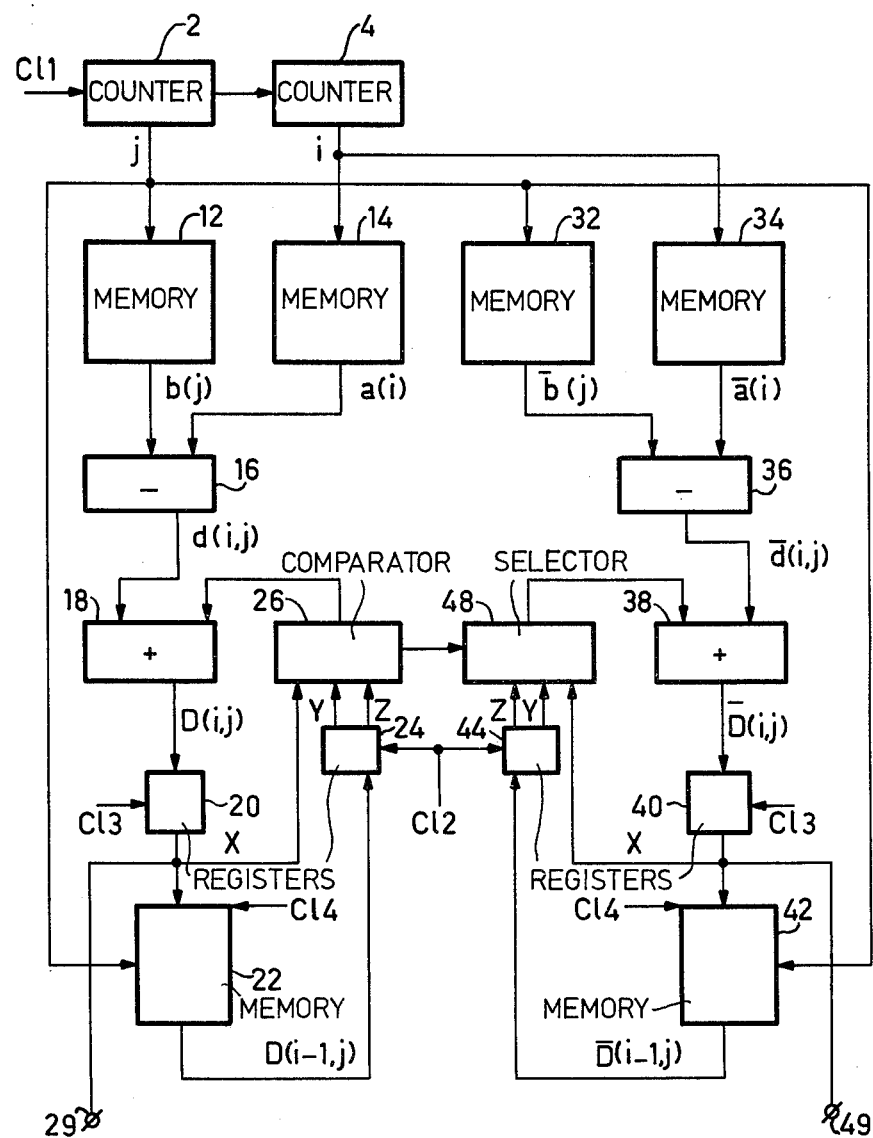
FIG. 3 is a block diagram of an arrangement for carrying out a method according to the invention.

FIG. 3 shows an arrangement for determining the overall distance value of a speech signal having a plurality of components, in which each new cumulative distance is computed separately for the different components.

In this arrangement a memory 12 contains the sampled values of the sound level of the speech signal and a memory 14 contains the corresponding sampled values of the reference signal. Furthermore, there is provided a memory 32, which contains the sampled values of the other components, for example the spectral values of the speech signals, and a memory 34 contains the corresponding sampled values of the reference signal. For addressing purposes there is provided a counter 2 whose outputs, which define the index j, are connected in parallel to the address inputs of the memories 12 and 32 and to the address inputs of further memories 22 and 42. The carry signal of the counter 2 is applied to the count input of a counter 4 whose parallel outputs, which define the row index i, are connected to the address inputs of the memories 14 and 34. The clock input of the counter 2 receives a clock signal C11. The memories 12 and 32, as well as the memories 22 and 42 to be described hereinafter, are thus sequentially addressed recurrently for each address of the memories 14 and 34. For the sake of simplicity the manner in which the computation of the optimum cumulative distance values is limited to the number shown in FIG. 1b is not indicated.

For each specific count in the counters 2 and 4 the corresponding memories 12, 14, 32, 34, 22 and 42 are read out. The memories 12 and 14 supply sampled values b(j) and a(i) respectively for the respective sound levels, which values are applied to a subtractor device 16. The output of device 16 thus supplies the difference d(i,j) between the relevant two sampled values of the sound levels, which difference value is applied to one input of an adder 18. The other input of said adder receives the minimum value of the three magnitudes X, Y and Z, which are contained in registers 20 and 24, form a minimum-value determining means 26. Means 26 may comprise, for example, three magnitude comparators, for example those available from Signetics under the type no. SN 7485, the outputs of which control selectors for feeding the respective quantities X, Y and Z to adder 18. The output of the adder 18, which provides the optimum cumulative distance value D(i,j), is applied to the register 20 and is loaded therein by means of a clock signal Cl3. When a next clock signal Cl4 occurs the contents of the register 20, which represents the magnitude X, are transferred to the memory 22 into the memory cell whose address is specified by the counter 2. Prior to this, the optimum cumulative distance value D(i−1,j) of the preceding row in the same column is read out of said memory 22 and is applied to the register 24, into which it is entered by means of clock signal Cl2. Suitably, said register 24 is a two-stage register which, when it accepts a new value, shifts the previous value into the second stage and erases the value contained therein. The clock signal Cl2 appears such a time after the clock signal Cl1 as is required by the memory 22 to output the contents of a memory cell after the application thereto of the relevant address. In this way the register 20 contains the optimum cumulative distance value of the preceding point in the same row and the register 24 contains the optimum cumulative distance values of the preceding and the same point of the preceding row. In this way the process represented by the block 105 of FIG. 2 is carried out in a simple manner.

In parallel with the above, the corresponding sampled values b(j) and a(i) of the other component(s) of the speech or test signal and the reference signal are read out and applied to an arrangement 36, which determines the difference value d(i,j) in known manner and applies this to one input of an adder 38. Via a selector 48, which is controlled by the minimum-value determining means 26, the other input of the adder receives the value of one of the magnitudes X, Y and Z which correspond to said other component(s) which value is received being determined by the minimum-value determining means 236. The values of said magnitudes are taken from the registers 40 and 44, the values of Y and Z being derived in turn from the memory 42; these three elements are controlled in the same way as the corresponding elements 20, 24 and 22 on the left-hand side.

When the counter 4 has supplied all the addresses of the memories 14 and 34 once and subsequently delivers a carry signal, the process is terminated and the overall distance values then contained in the registers 20 and 40 become available on outputs 29 and 49 and are applied to a classification device (not shown), which determines whether the speech signal is in conformity with the reference signal to a satisfactory extent.

We claim:

1. A method of measuring the degree of mis-match which would be obtained between first and second signals should their time-axes be subjected to a time alignment (if any) which is required to minimize the degree of mis-match, said method comprising the operational steps of:

(a) sampling values of both signals at regular time intervals and storing the sampled values in a memory;

(b) obtaining a difference value in a subtractor device and a distance value in an adder device for each combination of a sampled value of the first signal and a sampled value of the second signal, at least if the corresponding distance value is less than a predetermined amount;

said difference value being obtained by the steps of:

obtaining said difference and distance values in succession for the combinations of the first sampled value of the first signal and the successive sampled values of the second signal, the next sampled value of the first signal and the successive sampled values of the second signal, and similary up to the last sampled value of the first signal and the successive sampled values of the second signal; and calculating each said distance value as the sum of the corresponding difference value and the smallest of those three adjacent distance values (if present) which have been obtained for the combination of the corresponding sampled value of the first signal and the sampled value of the second signal immediately preceding the corresponding sampled value of the second signal, the combination of the corresponding sampled value of the second signal and the sampled value of the first signal immediately preceding the corresponding sampled value of the first signal, and the combination of the sampled values of both signals immediatley preceding the corresponding sampled values of the first and second signals; which distance values (if present) have been stored temporarily in a memory as well; the smallest of those three adjacent distance values (if present) being determined in a minimum value determining means; and (c) deriving a measure of the said degree of mis-match from the distance value obtained for the combination of the last sampled values of both signals;

performing said operational steps (a), (b) and (c) for one component of each signal; and performing a modified set of said operational steps (a), (b) and (c) separately and in parallel for another component or set of other components of each signal, the modification including the step of replacing the smallest of those three adjacent distance values (if present) each time by that adjacent distance value which corresponds in time to the smallest adjacent distance value currently used to obtain the distance value of the one component.

2. A method as claimed in claim 1, including the step of, while obtaining each said distance value, storing only the distance values (if present) which have been obtained for (i) the combinations of the corresponding sampled value of the first signal and a succession of sampled values of the second signal which immediately precedes the corresponding sampled value of the second signal, (ii) the combinations of the sampled value of the first signal immediately preceding the corresponding sampled value of the first signal and a succession of sampled values of the second signal which starts with and then immediately follows the corresponding sampled value of the second signal, and (iii) the combination of the sampled values which immediately precede the corresponding sampled values of both signals are stored.

3. A method as claimed in claim 1 or claim 2, wherein for performing the modified set of such operations (a), (b) and (c) for a set of other components of each signal, including the step of calculating each difference value for said modified set as a combination of the corresponding difference values for the members of the said set of other components.

4. A method as claimed in claims 1 or 2, further including the step of applying all distance values determined for the last sampled values of both signals directly to a classification device.

5. An apparatus for carrying out a method for measuring the degree of mis-match between first and second signals, comprising:

a first memory for the storage of the sampled values of the first signal;

a second memory for the storage of the sampled values of the second signal; and a processing unit which determines for a number of combinations of a sampled value of the first signal and a sampled value of the second signal, a difference value and a distance value, said processing unit comprising a subtractor device for determining a difference value and an adder device for determining a distance value, each said distance value being determined from the corresponding difference value and the smallest of those three adjacent distance values (if present) which have been obtained for the combination of the corresponding sampled value of the first signal and the sampled value of the second signal immediately preceding the corresponding sampled value of the second signal the combination of the corresponding sampled value of the second signal and the sampled value of the first signal immediately preceding the corresponding sampled value of the first signal, and the combination of the sampled values of both signals immediately preceding the corresponding sampled values of the first and second signals, the processing unit comprising:

a third memory for the storage of the distance values (if present) of (a) the combinations of the corresponding sampled value of the first signal and a succession of sampled values of the second signal which immediately precedes the corresponding sampled value of the second signal, (b) the combinations of the sampled value of the first signal immediately preceding the corresponding sampled value of the first signal and a succession of sampled values of the second signal which starts with and then immediately follows the corresponding sampled value of the second signal; the processing unit further comprising:

a fourth memory for the storage of the distance values of the combination of the sampled value of the first signal and the sampled value of the second signal immediately preceding the corresponding sampled value of the second signal, the combination of the sampled value of the first signal immediately preceding the corresponding sampled value of the first signal and the sampled value of the second signal, and the combination of the sampled values of both signals which immediately precede the corresponding sampled values of both signals; the processing unit further comprising:

minimum value determining means for determining the smallest value of the said three adjacent distance values and feeding the said smallest value to an adding circuit, for determining the distance value of the combination of the corresponding sampled value of the first and second signal, to another input of which the difference value of the said combination is applied, characterized in that:

for the processing of two signals comprising a plurality of mutually similar components in which the method is carried out for one component of each signal, the apparatus comprises:

a second processing unit including a second subtractor device, a second adder device and a value determining means, the one minimum value determining means being controlled by the other value determining means, the one minimum value determining means determining the smallest of the three distance values for the component of the one signal, the other value determining means choosing the corresponding distance value of the same combination but for the component of the other signal.

* * * * *